(12) United States Patent
Kimura et al.

(10) Patent No.: US 8,350,420 B2
(45) Date of Patent: Jan. 8, 2013

(54) WINDING METHOD OF ELECTRIC MOTOR, ELECTRIC MOTOR AND SEATBELT DEVICE PROVIDED THEREWITH

(75) Inventors: Takaaki Kimura, Tokyo (JP); Takahiro Mori, Tokyo (JP)

(73) Assignee: Takata Corporation, Tokyo (JP)

( * ) Notice: Subject to any disclaimer, the term of this patent is extended or adjusted under 35 U.S.C. 154(b) by 87 days.

(21) Appl. No.: 12/990,639

(22) PCT Filed: Dec. 26, 2008

(86) PCT No.: PCT/JP2008/073684
§ 371 (c)(1),
(2), (4) Date: Nov. 1, 2010

(87) PCT Pub. No.: WO2009/144854
PCT Pub. Date: Dec. 3, 2009

(65) Prior Publication Data
US 2011/0062697 A1    Mar. 17, 2011

(30) Foreign Application Priority Data
May 30, 2008  (JP) .................. 2008-142227

(51) Int. Cl.
*H02K 41/02*  (2006.01)
(52) U.S. Cl. ............... 310/12.13; 310/12.14; 310/12.24; 310/13; 310/14
(58) Field of Classification Search .............. 280/807; 310/225, 231, 233, 234, 12.13, 12.14, 12.24, 310/13, 14, 309, 323.02, 325
See application file for complete search history.

(56) References Cited

U.S. PATENT DOCUMENTS

| | | | |
|---|---|---|---|
| 4,876,472 A | 10/1989 | Shiraki et al. | |
| 5,202,599 A * | 4/1993 | Kao | 310/234 |
| 6,756,717 B2 * | 6/2004 | Yamamoto et al. | 310/225 |
| 6,969,930 B2 * | 11/2005 | Lin et al. | 310/49.33 |
| 7,239,096 B2 * | 7/2007 | Hancock et al. | 318/59 |
| 7,250,702 B2 * | 7/2007 | Abou Akar et al. | 310/114 |

(Continued)

FOREIGN PATENT DOCUMENTS
JP            1-133551         5/1989
(Continued)

OTHER PUBLICATIONS
International Search Report in PCT/JP2008/073684 dated Apr. 7, 2009.

*Primary Examiner* — Toan To
(74) *Attorney, Agent, or Firm* — Foley & Lardner LLP

(57) ABSTRACT

An electric motor 1 includes a rotor core 22 having n pieces of teeth T arranged in the circumferential direction around which a coil wire 23 is wound, a commutator 24 having n pieces of segments 24a 24b, and 24c, and the coil wire 23 having a connecting wire portion 23a that connects the teeth T and the segments 24a, 24b, and 24c and a crossover portion 23b that interconnects the segments 24a, 24b, and 24c at the opposite pole positions of the commutator 24 around a shaft 23. The crossover portion 23b that connects the i-th (i=1 to n) and the (i+n/2)th of the segments 24a, 24b, and 24c is wound prior to the connecting wire portion 23b that connects the teeth T connected with the i-th segment 24a, 24b, 24c and the (i+1)th segment 24a, 24b, 24c, respectively.

4 Claims, 9 Drawing Sheets

U.S. PATENT DOCUMENTS

| | | | |
|---|---|---|---|
| 7,560,848 B2 * | 7/2009 | Roos et al. ............... | 310/234 |
| 7,830,061 B2 * | 11/2010 | Matsuura et al. ........... | 310/194 |
| 7,982,354 B2 * | 7/2011 | Qin et al. ................. | 310/198 |
| 8,125,117 B2 * | 2/2012 | Zhao et al. ................ | 310/233 |
| 2003/0201690 A1 | 10/2003 | Mori | |
| 2004/0150280 A1 | 8/2004 | Moroto et al. | |

FOREIGN PATENT DOCUMENTS

| | | |
|---|---|---|
| JP | 2003-189572 | 7/2003 |
| JP | 2003-324927 | 11/2003 |
| JP | 2004-328987 | 11/2004 |
| JP | 2005-341654 | 12/2005 |
| JP | 2006-180678 | 7/2006 |
| JP | 2007-043831 | 2/2007 |
| JP | 2007-176343 | 7/2007 |
| JP | 2007-282451 | 10/2007 |
| WO | WO-2006/137125 A1 | 12/2006 |

* cited by examiner

WINDING METHOD OF ELECTRIC MOTOR, ELECTRIC MOTOR AND SEATBELT DEVICE PROVIDED THEREWITH

TECHNICAL FIELD

The present invention belongs to a technical field of a winding method of an electric motor, an electric motor and a seatbelt device provided therewith.

BACKGROUND ART

In an electric motor with four or more poles of small-sized magnets, brushes cannot be arranged in the same number as that of the magnets due to a problem of layout in many cases. In such a case, an opposite pole segment of a commutator needs to be connected by a crossover portion.

A rotor made up by an armature core to which a shaft is fitted and fixed and having a plurality of salient poles and a coil with winding continuously wound around each of the salient poles in which a crossover portion to the coil of the continuously wound winding is wound around the shaft once or more and is disposed so as not to disconnect the crossover portion is disclosed (See Patent Document 1).

[Patent Document 1] Japanese Unexamined Patent Application Publication No. 2006-180678

DISCLOSURE OF INVENTION

Problems to be Solved by the Invention

However, if a coil wire 23 of a single continuous line is to be wound, as shown in FIG. 12, a crossover portion 23b is wound over a connecting wire portion 23a, and there is a fear that the connecting wire portion 23a is tightened by a tension of the crossover portion 23b, which damages coil wire 23.

The present invention was made in view of the above circumstances and has an object to provide a winding method of an electric motor, an electric motor, and a seatbelt device provided therewith in which a burden is not applied to a coil wire, disconnection or damage on the coil wire can be reduced and productivity can be improved.

Means for Solving the Problems

In order to solve the above problems, an electric motor according to an embodiment of the present invention includes a frame having a magnet on an inner circumference, a shaft rotatably supported by the frame, a rotor core fixed to the shaft, one coil wire wound around the rotor core, and a commutator fixed to the shaft and connected to the coil wire, in which the rotor core has n pieces of teeth arranged in the circumferential direction around which the coil wire is wound, the commutator has n pieces of segments, and the coil wire has a connecting wire portion that connects the teeth and the segments and a crossover portion that interconnects the segments at the opposite pole positions of the commutator around the shaft, characterized in that the crossover portion that connects the i-th (i=1 to n) and the (i+n/2)th of the segments is wound prior to the connecting wire portion that connects the teeth connected with the i-th segment and the (i+1)th segment, respectively.

In another embodiment of the present invention, an electric motor includes a frame having a magnet on an inner circumference, a shaft rotatably supported by the frame, a rotor core fixed to the shaft, one coil wire wound around the rotor core, and a commutator fixed to the shaft and connected to the coil wire, characterized in that the rotor core has a plurality of teeth arranged in the circumferential direction around which the coil wire is wound, the commutator has segments in the same number as that of the plurality of teeth, the coil wire has a connecting wire portion that connects the teeth and the segments and a crossover portion that interconnects the segments at the opposite pole positions of the commutator around the shaft, and the crossover portion is arranged inside the connecting wire portion.

In another embodiment of the present invention, a seatbelt device includes at least a seatbelt that constrains an occupant in an emergency, a seatbelt retractor that retracts the seatbelt, a guide anchor for the seatbelt that guides the seatbelt withdrawn from the seatbelt retractor toward the shoulder of the occupant, a tongue plate slidably supported by the seatbelt guided from the guide anchor for seatbelt, and a buckle in which the tongue plate is detachably inserted and engaged, characterized in that the seatbelt can be retracted by the seatbelt retractor provided with an electric motor.

According to an electric motor according to the present invention constructed as above, no burden is applied to a coil wire, disconnection or damage on the coil wire can be reduced, and productivity can be improved. Moreover, the seatbelt device provided with this electric motor can be stably operated.

BEST MODES FOR CARRYING OUT THE INVENTION

Figure 1:
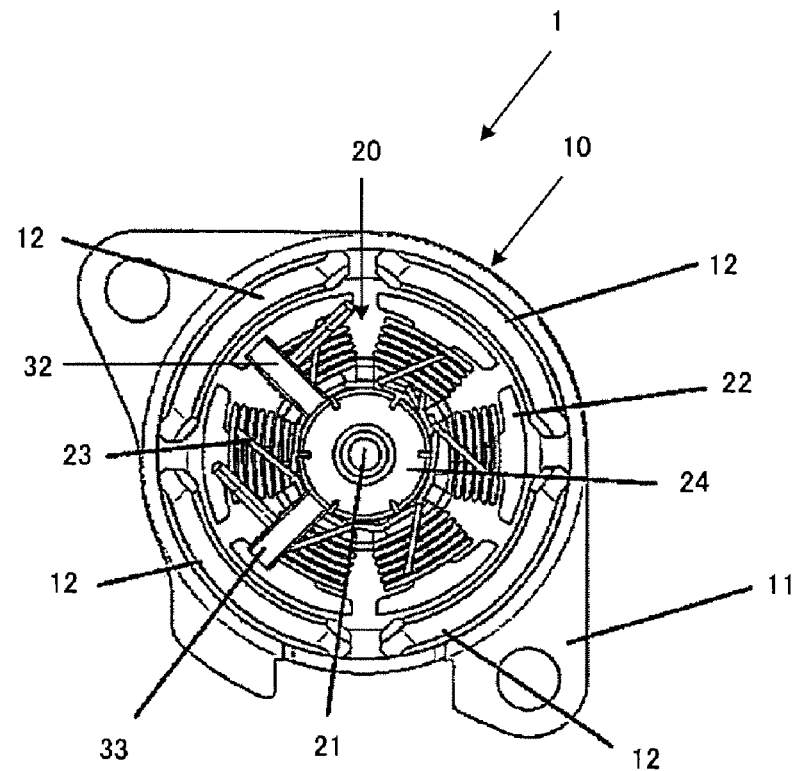
FIG. 1 is a sectional view of an electric motor of this embodiment.

An embodiment of the present invention is described below using the attached drawings. FIG. 1 is a sectional view illustrating an embodiment of an electric motor according to the present invention.

An electric motor 1 is provided with a frame portion 10 and a rotor portion 20.

The frame portion 10 has a cylindrical frame 11, one end of which is opened and the other closed, and a magnet 12, and the magnet 12 is bonded and fixed to an inner circumferential face of the frame 11. The magnet of this embodiment has four magnetic poles and constituted to be magnetized after the magnet 12 is bonded to the frame 11. Also, though not shown, the frame 11 has an opening portion, through which the rotor portion 20 is inserted on one side, and a supporting portion that supports the rotor portion 20 on the other side with respect to the axial direction of the cylindrical shape.

The rotor portion 20 has a shaft 21 to become a central axis in rotation, a rotor core 22 fixed to the shaft 21, a coil wire 23 made of one continuous line and wound around the rotor core 22, and a commutator 24 fixed to the shaft 21 and connected to the coil wire 23.

Also, a first brush 32 and a second brush 33 are disposed such that they are installed on a bracket covering the opening portion of the frame 11, having an arrangement angle in the circumferential direction of the commutator 24 as a right angle and sliding in a direction orthogonal to the axial line of the commutator 24, capable of being brought into contact.

Figure 2:
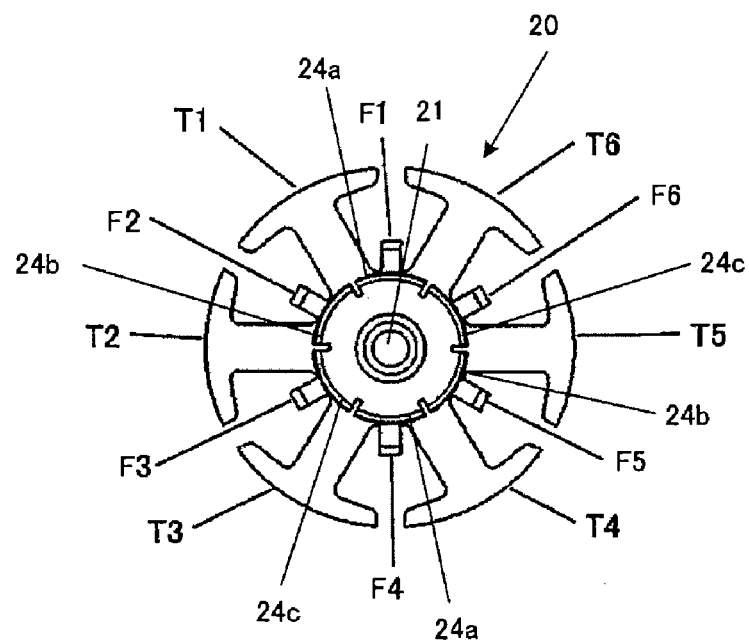
FIG. 2 is a sectional view of a rotor portion of the electric motor of this embodiment.

FIG. 2 is a sectional view of the rotor portion 20 in the electric motor 1 of this embodiment. The rotor core 22 has six teeth T from a first tooth T1 to a sixth tooth T6 around which the coil wire 23 is wound. Also, the commutator 24 is divided into six parts in the circumferential direction around the shaft 21 and has first opposite pole segments 24a, second opposite pole segments 24b, and third opposite pole segments 24c forming pairs, respectively, arranged on the opposite sides with respect to the shaft 21. Moreover, the commutator 24 has hooks F by which the coil wire 23 is hooked at lower parts of each of the segments 24a, 24b, and 24c.

The hooks F include, as shown in FIG. 2, a first hook F1 between the first tooth T1 and the sixth tooth T6, a second hook F2 between the first tooth T1 and the second tooth T2, a third hook F3 between the second tooth T2 and the third tooth T3, a fourth hook F4 between the third tooth T3 and the fourth tooth T4, a fifth hook F5 between the fourth tooth T4 and the fifth tooth T5, and a sixth hook F6 between the fifth tooth T5 and the sixth tooth T6, respectively, when seen from the axial direction of the shaft 21.

Figure 3:
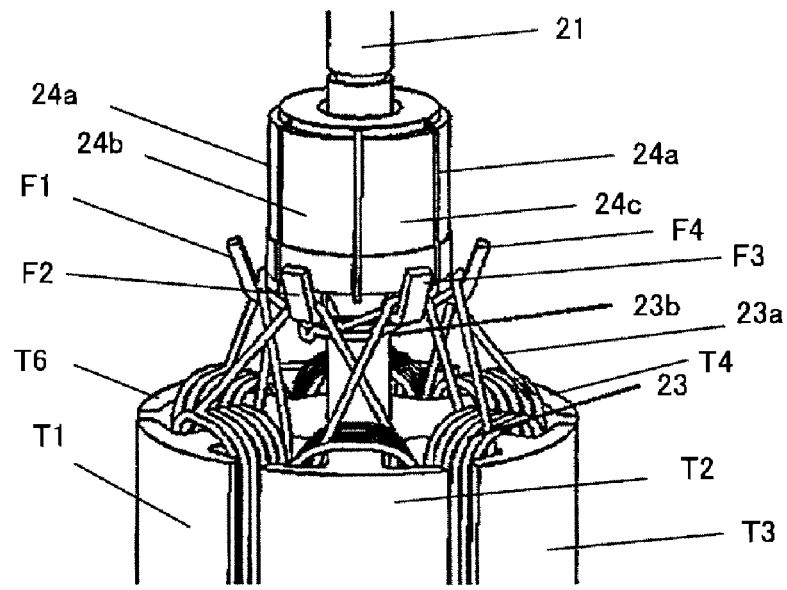
FIG. 3 is a perspective view of the rotor portion in a state in which a coil wire is wound of the electric motor of this embodiment seen from above.
Figure 4:
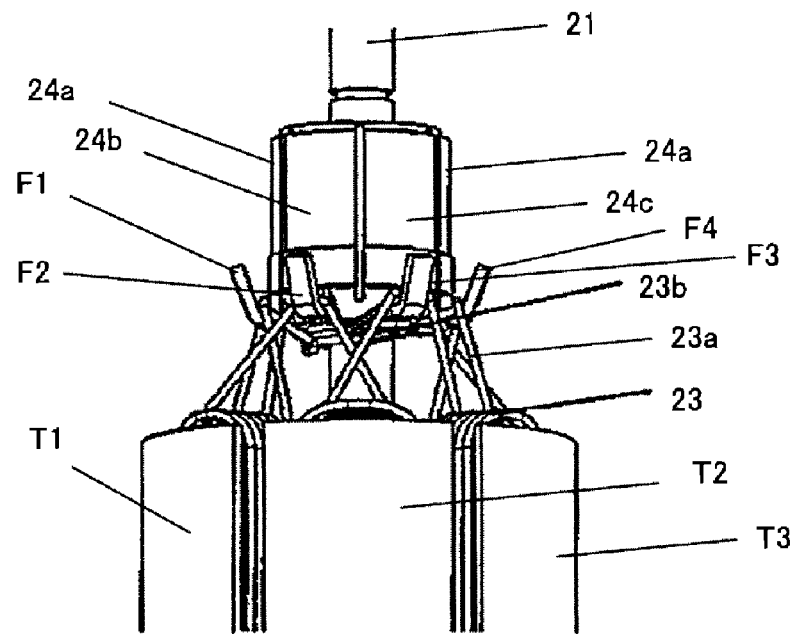
FIG. 4 is a perspective view of the rotor portion in a state in which the coil wire is wound of the electric motor of this embodiment seen from below.

FIG. 3 is a perspective view of the rotor portion 20 in a state in which the coil wire 23 is wound when seen from above, and FIG. 4 is a perspective view of the rotor portion 20 in the state in which the coil wire 23 is wound when seen from below.

As shown in FIGS. 3 and 4, the coil wire 23 is wound around each tooth T, and the coil wires 23 wound around the adjacent teeth T are connected by a connecting wire portion 23a, respectively. The connecting wire portion 23a is hooked by the hook F of the commutator 24 arranged between the adjacent teeth T when seen from the axial direction.

The electric motor 1 of this embodiment uses, as shown in FIG. 1, the two brushes 32 and 33 for the four-pole magnet 12, and each of the opposite pole segments 24a, 24b, and 24c of the commutator 24 needs to be interconnected by a crossover portion 23b, respectively. When the crossover portion 23b is to be connected, the crossover portion 23b has a structure to be arranged inside the connecting wire portion 23a.

As mentioned above, since the electric motor 1 of this embodiment includes the frame 11 having the magnet 12 on the inner circumference, the shaft 21 rotatably supported by the frame 11, the rotor core 22 fixed to the shaft 21, the single coil wire 23 wound around the rotor core 22, and the commutator 24 fixed to the shaft 21 and connected to the coil wire 23, the rotor core 22 has the teeth T arranged in plural in the circumferential direction around which the coil wire 23 is wound, the commutator 24 has the segments 24a, 24b, and 24c in the same number as that of the plural teeth T, the coil wire 23 has the connecting wire portion 23a that connects the teeth T and the segments 24a, 24b, and 24c and the crossover portion 23b that interconnects the segments 24a, 24b, and 24c at the opposite pole positions around the shaft 21 of the commutator 24, and the crossover portion 23b is arranged inside the connecting wire portion 23a, a burden is not applied to the coil wire, and disconnection or damage on the coil wire can be reduced.

Figure 5:
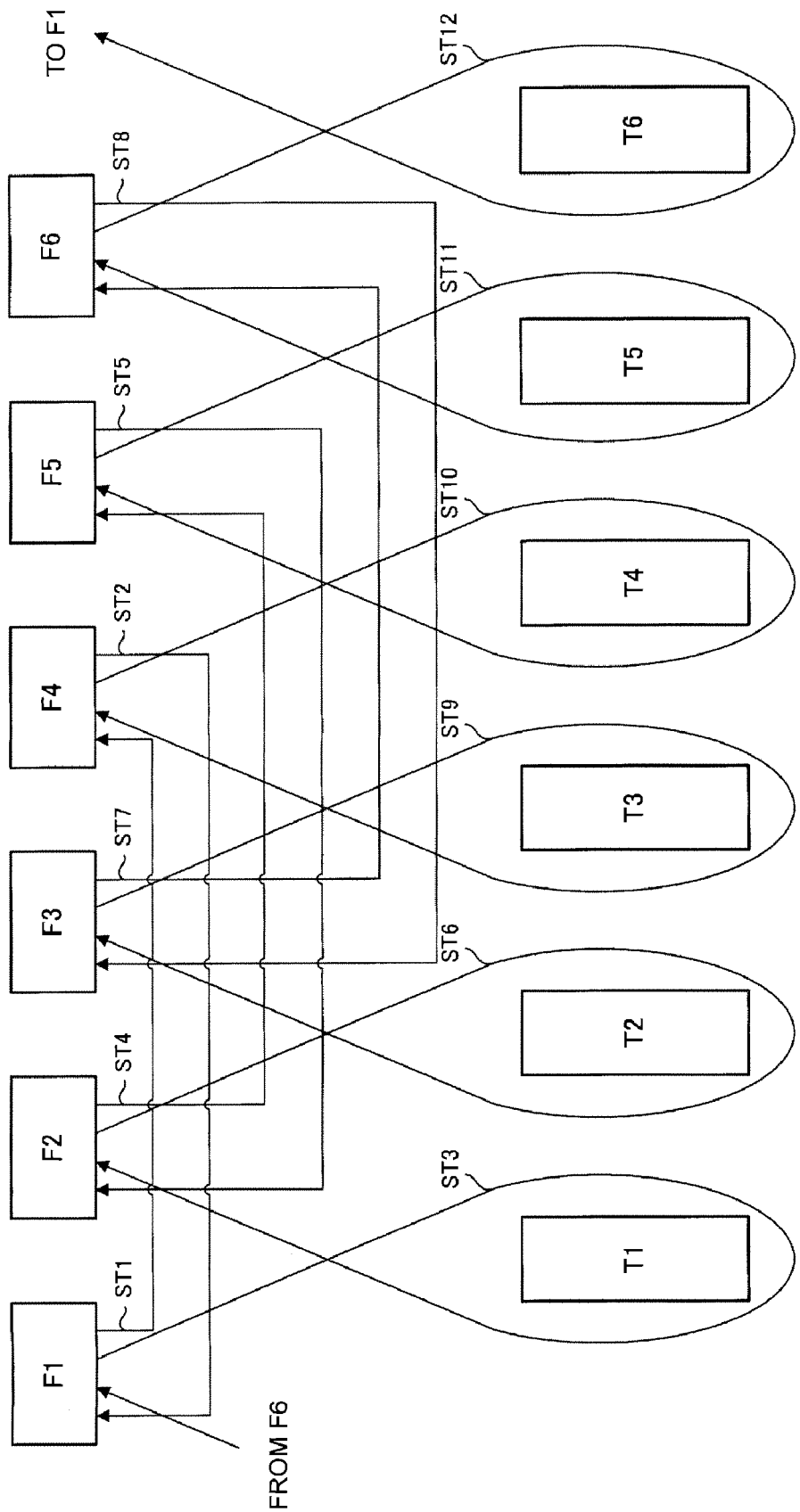
FIG. 5 is a conceptual diagram illustrating Example 1 of a winding method of the coil wire.
Figure 6:
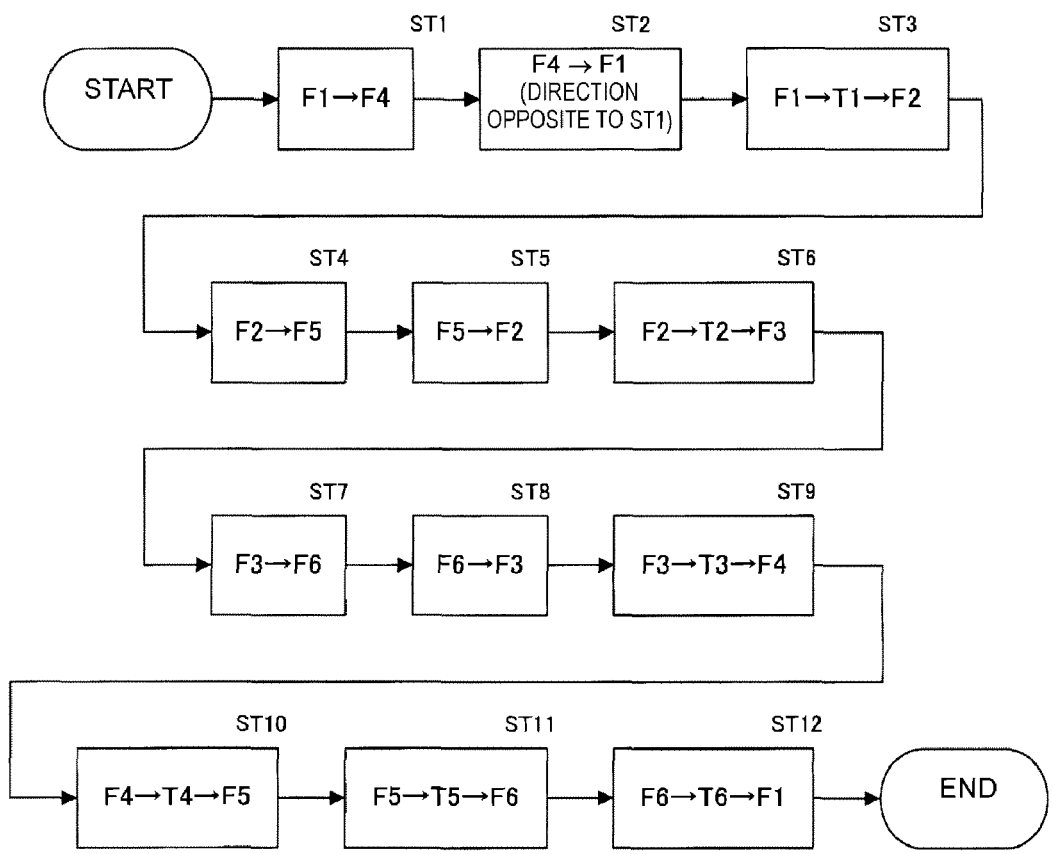
FIG. 6 is a flowchart of Example 1 of the winding method of the coil wire.

FIG. 5 is a conceptual diagram illustrating Example 1 of a winding method of the coil wire 23, and FIG. 6 is a flowchart of Example 1 of the winding method of the coil wire 23.

First, at Step 1, the crossover portion 23b is connected from the first hook F1 to the fourth hook F4 (ST1). Then, at Step 2, the rotor portion 20 is rotated in the direction opposite to that at Step 1, and the crossover portion 23b is connected so as to return from the fourth hook F4 to the first hook F1 (ST2).

Subsequently, at Step 3, the coil connecting wire portion 23a is connected from the first hook F1 to the first tooth T1, the coil wire 23 is wound around the first tooth T1, and the coil connecting wire portion 23a is connected from the first tooth T1 to the second hook F2 (ST3).

Subsequently, at Step 4, the crossover portion 23b is connected from the second hook F2 to the fifth hook F5 (ST4). Then, at Step 5, the rotor portion 20 is rotated in the direction opposite to that at Step 4, and the crossover portion 23b is connected so as to return from the fifth hook F5 to the second hook F2 (ST5).

Subsequently, at Step 6, the coil connecting wire portion 23a is connected from the second hook F2 to the second tooth T2, the coil wire 23 is wound around the second tooth T2, and the coil connecting wire portion 23a is connected from the second tooth T2 to the third hook F3 (ST6).

Subsequently, at Step 7, the crossover portion 23b is connected form the third hook F3 to the sixth hook F6 (ST7). Then, at Step 8, the rotor portion 20 is rotated in the direction opposite to that at Step 7, and the crossover portion 23b is connected so as to return from the sixth hook F6 to the third hook F3 (ST8).

Subsequently, at Step 9, the coil connecting wire portion 23a is connected from the third hook F3 to the third tooth T3, the coil wire 23 is wound around the third tooth T3, and the coil connecting wire portion 23a is connected from the third tooth T3 to the fourth hook F4 (ST9).

Subsequently, at Step 10, the coil connecting wire portion 23a is connected from the fourth hook F4 to the fourth tooth T4, the coil wire 23 is wound around the fourth tooth T4, and the coil connecting wire portion 23a is connected from the fourth tooth T4 to the fifth hook F5 (ST10).

Subsequently, at Step 11, the coil connecting wire portion 23a is connected from the fifth hook F5 to the fifth tooth T5, the coil wire 23 is wound around the fifth tooth T5, and the coil connecting wire portion 23a is connected from the fifth tooth T5 to the sixth hook F6 (ST11).

Subsequently, at Step 12, the coil connecting wire portion 23a is connected from the sixth hook F6 to the sixth tooth T6, the coil wire 23 is wound around the sixth tooth T6, and the coil connecting wire portion 23a is connected from the sixth tooth T6 to the first hook F1 (ST12).

Figure 7:
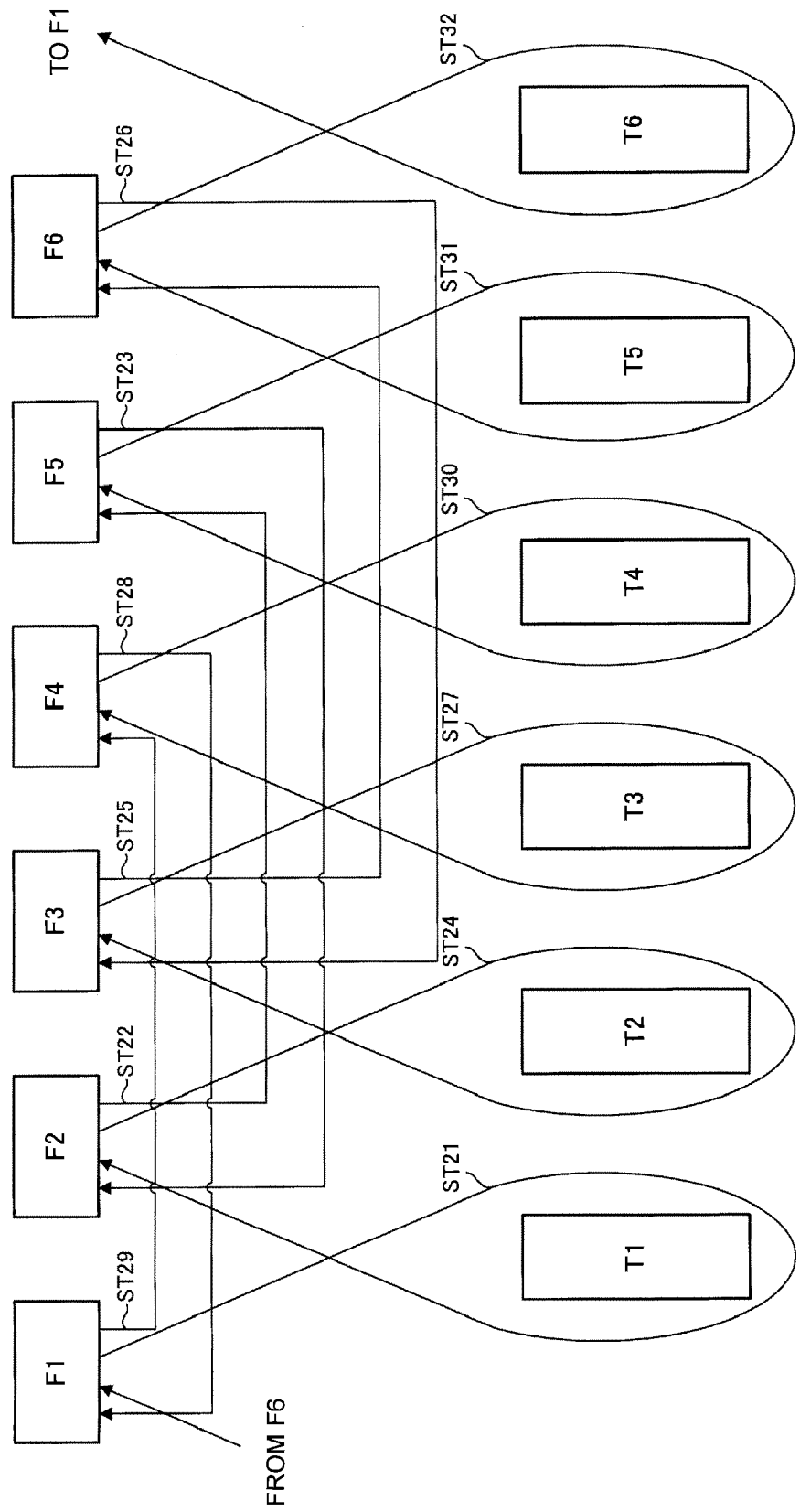
FIG. 7 is a conceptual diagram illustrating Example 2 of a winding method of the coil wire.
Figure 8:
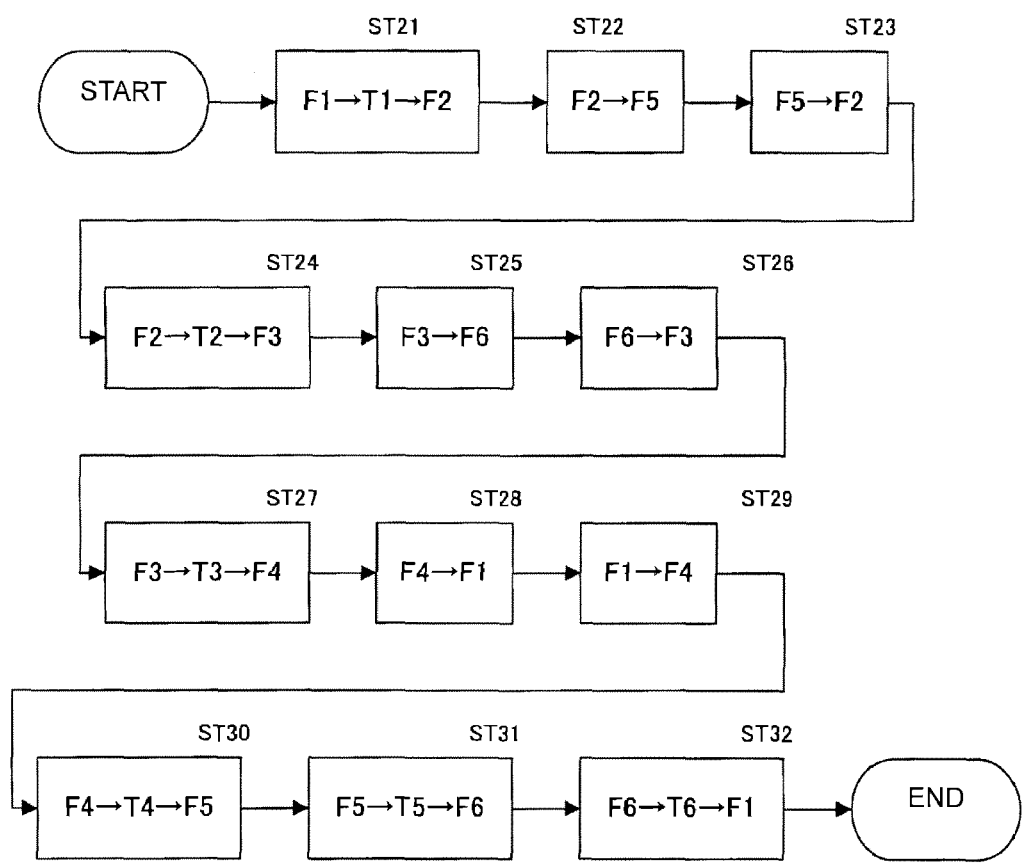
FIG. 8 is a flowchart of Example 2 of the winding method of the coil wire.

FIG. 7 is a conceptual diagram illustrating Example 2 of the winding method of the coil wire 23, and FIG. 8 is a flowchart of Example 2 of the winding method of the coil wire 23.

First, at Step 21, the coil connecting wire portion 23a is connected from the first hook F1 to the first tooth T1, the coil wire 23 is wound around the first tooth T1, and the coil connecting wire portion 23a is connected from the first tooth T1 to the second hook F2 (ST21).

Subsequently, at Step 22, the crossover portion 23*b* is connected from the second hook F2 to the fifth hook F5 (ST22). Then, at Step 23, the rotor portion 20 is rotated in the direction opposite to that at Step 4, and the crossover portion 23*b* is connected so as to return from the fifth hook F5 to the second hook F2 (ST23).

Subsequently, at Step 24, the coil connecting wire portion 23*a* is connected from the second hook F2 to the second tooth T2, the coil wire 23 is wound around the second tooth T2, and the coil connecting wire portion 23*a* is connected from the second tooth T2 to the third hook F3 (ST24).

Subsequently, at Step 25, the crossover portion 23*b* is connected from the third hook F3 to the sixth hook F6 (ST25). Then, at Step S26, the rotor portion 20 is rotated in the direction opposite to that at Step 7, and the crossover portion 23*b* is connected so as to return from the sixth hook F6 to the third hook F3 (ST26).

Subsequently, at Step 27, the coil connecting wire portion 23*a* is connected from the third hook F3 to the third tooth T3, the coil wire 23 is wound around the third teeooth T3, and the coil connecting wire portion 23*a* is connected from the third tooth T3 to the fourth hook F4 (ST27).

Subsequently, at Step 28, the crossover portion 23*b* is connected from the fourth hook F4 to the first hook F1 (ST28). Then, at Step S29, the rotor portion 20 is rotated in the direction opposite to that at Step 28, and the crossover portion 23*b* is connected so as to return from the first hook F1 to the fourth hook F4 (ST29).

Subsequently, at Step 30, the coil connecting wire portion 23*a* is connected from the fourth hook F4 to the fourth tooth T4, the coil wire 23 is wound around the fourth tooth T4, and the coil connecting wire portion 23*a* is connected from the fourth tooth T4 to the fifth hook F5 (ST30).

Subsequently, at Step 31, the coil connecting wire portion 23*a* is connected from the fifth hook F5 to the fifth tooth T5, the coil wire 23 is wound around the fifth tooth T5, and the coil connecting wire portion 23*a* is connected from the fifth tooth T5 to the sixth hook F6 (ST31).

Subsequently, at Step 32, the coil connecting wire portion 23*a* is connected from the sixth hook F6 to the sixth tooth T6, the coil wire 23 is wound around the sixth tooth T6, and the coil connecting wire portion 23*a* is connected from the sixth tooth T6 to the first hook F1 (ST32).

Figure 9:
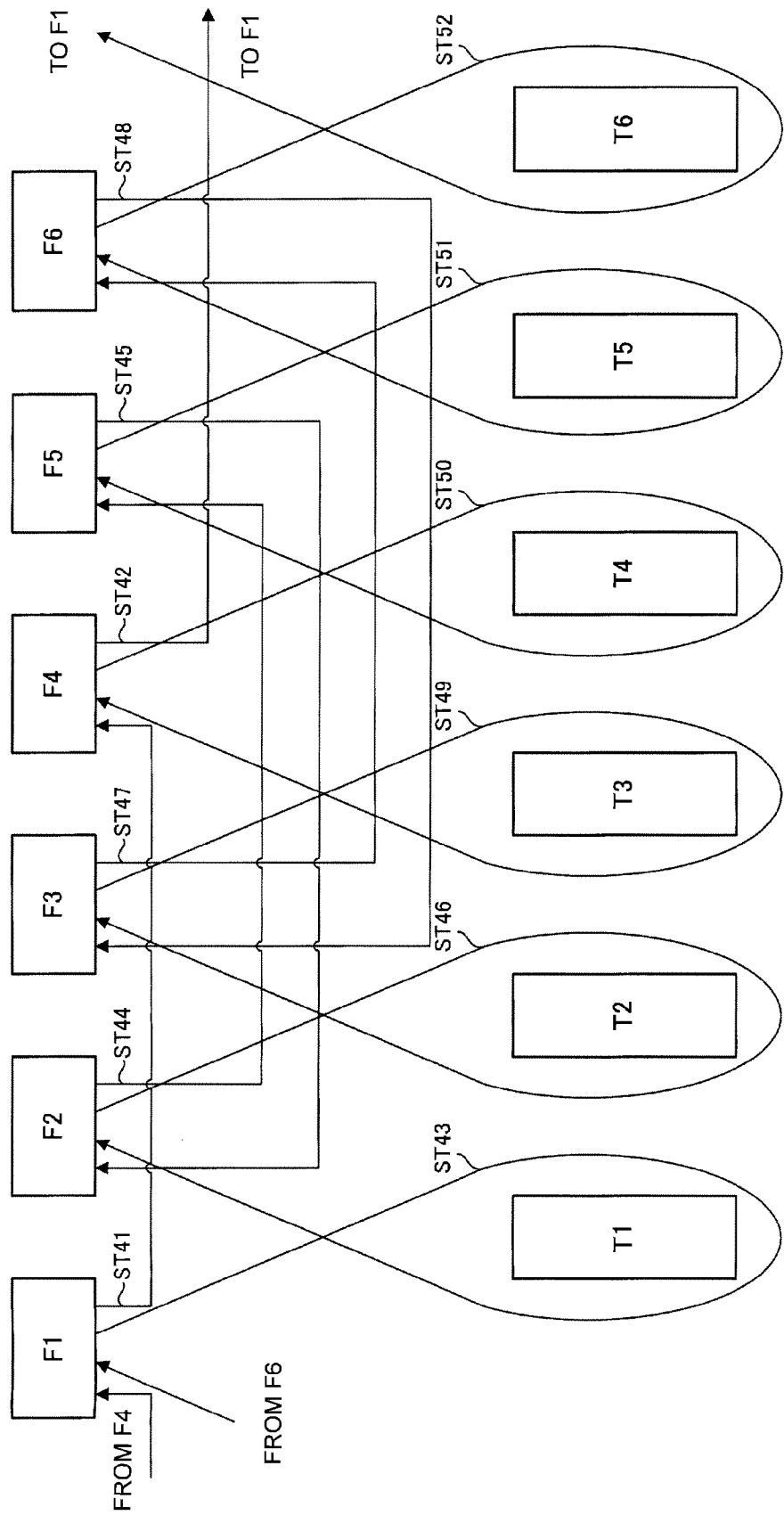
FIG. 9 is a conceptual diagram illustrating Example 3 of a winding method of the coil wire.
Figure 10:
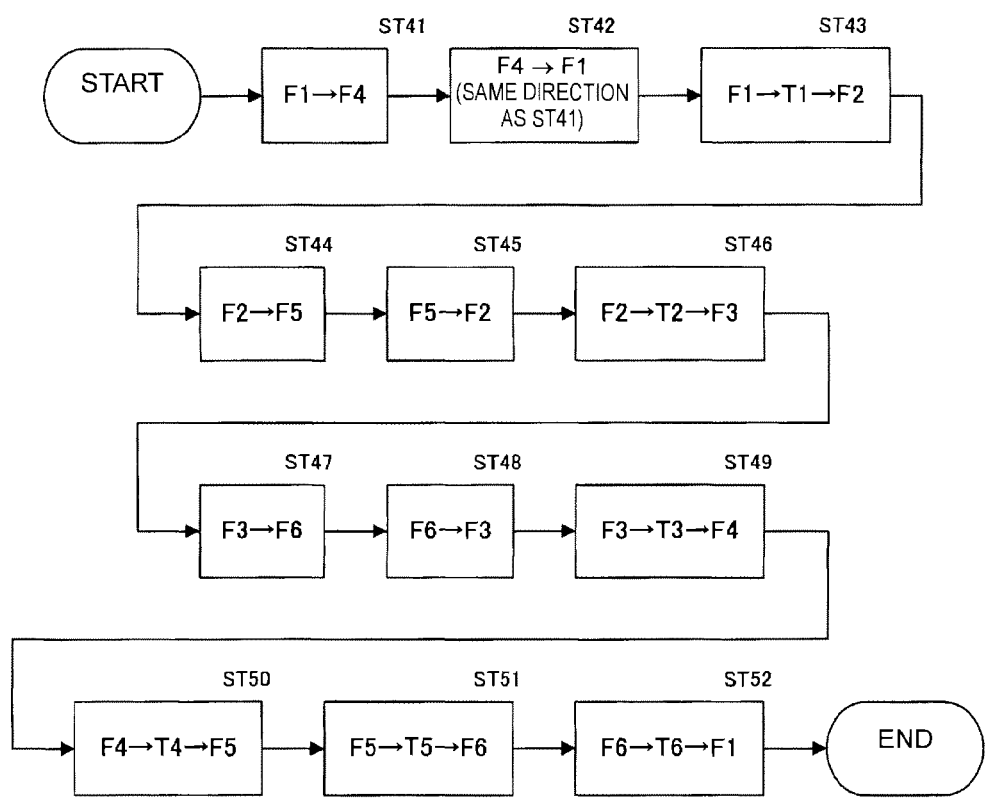
FIG. 10 is a flowchart of Example 3 of the winding method of the coil wire.

FIG. 9 is a conceptual diagram illustrating Example 3 of the winding method of the coil wire 23, and FIG. 10 is a flowchart of Example 3 of the winding method of the coil wire 23.

First, at Step 41, the crossover portion 23*b* is connected from the first hook F1 to the fourth hook F4 (ST41). Then, at Step 42, the rotor portion 20 is rotated in the same direction as that of Step 21, and the crossover portion 23*b* is connected so as to return from the fourth hook F4 to the first hook F1 (ST42).

Subsequently, at Step 43, the coil connecting wire portion 23*a* is connected from the first hook F1 to the first tooth T1, the coil wire 23 is wound around the first tooth T1, and the coil connecting wire portion 23*a* is connected from the first tooth T1 to the second hook F2 (ST43).

Subsequently, at Step 44, the crossover portion 23*b* is connected from the second hook F2 to the fifth hook F5 (ST44). Then, at Step S45, the rotor portion 20 is rotated in the direction opposite to that at Step 24, and the crossover portion 23*b* is connected so as to return from the fifth hook F5 to the second hook F2 (ST45).

Subsequently, at Step 46, the coil connecting wire portion 23*a* is connected from the second hook F2 to the second tooth T2, the coil wire 23 is wound around the second tooth T2, and the coil connecting wire portion 23*a* is connected from the second tooth T2 to the third hook F3 (ST46).

Subsequently, at Step 47, the crossover portion 23*b* is connected from the third hook F3 to the sixth hook F6 (ST47). Then, at Step 48, the rotor portion 20 is rotated in the direction opposite to that at Step 47, and the crossover portion 23*b* is connected so as to return from the sixth hook F6 to the third hook F3 (ST48).

Subsequently, at Step 49, the coil connecting wire portion 23*a* is connected from the third hook F3 to the third tooth T3, the coil wire 23 is wound around the third tooth T3, and the coil connecting wire portion 23*a* is connected from the third tooth T3 to the fourth hook F4 (ST49).

Subsequently, at Step 50, the coil connecting wire portion 23*a* is connected from the fourth hook F4 to the fourth tooth T4, the coil wire 23 is wound around the fourth tooth T4, and the coil connecting wire portion 23*a* is connected from the fourth tooth T4 to the fifth hook F5 (ST50).

Subsequently, at Step 51, the coil connecting wire portion 23*a* is connected from the fifth hook F5 to the fifth tooth T5, the coil wire 23 is wound around the fifth tooth T5, and the coil connecting wire portion 23*a* is connected from the fifth tooth T5 to the sixth hook F6 (ST51).

Subsequently, at Step 52, the coil connecting wire portion 23*a* is connected from the sixth hook F6 to the sixth tooth T6, the coil wire 23 is wound around the sixth tooth T6, and the coil connecting wire portion 23*a* is connected from the sixth tooth T6 to the first hook F1 (ST52).

According to the winding method of the electric motor 1 of this embodiment constituted as above, in the winding method of the electric motor 1 in which the rotor core 22 has n pieces of teeth T arranged in the circumferential direction around which the coil wire 23 is wound, the commutator 24 has n pieces of segments 24*a*, 24*b*, and 24*c*, the coil wire 23 has the connecting wire portion 23*a* that connects the teeth T and the segments 24*a*, 24*b*, and 24*c* and the crossover portion 23*b* that interconnects the segments 24*a*, 24*b*, and 24*c* at the opposite pole positions around the shaft 21 of the commutator 24, since the crossover portion 23*b* that connects the i-th (i=1 to n) and the (i+n/2)th of the segments 24*a*, 24*b*, and 24*c* is wound prior to the connecting wire portion 23*a* that connects the teeth T connected with the i-th segment and the (i+1)th segment of the segments 24*a*, 24*b*, and 24*c*, respectively, a burden is not applied to the coil wire, disconnection or damage on the coil wire can be reduced, and productivity can be improved.

Figure 11:
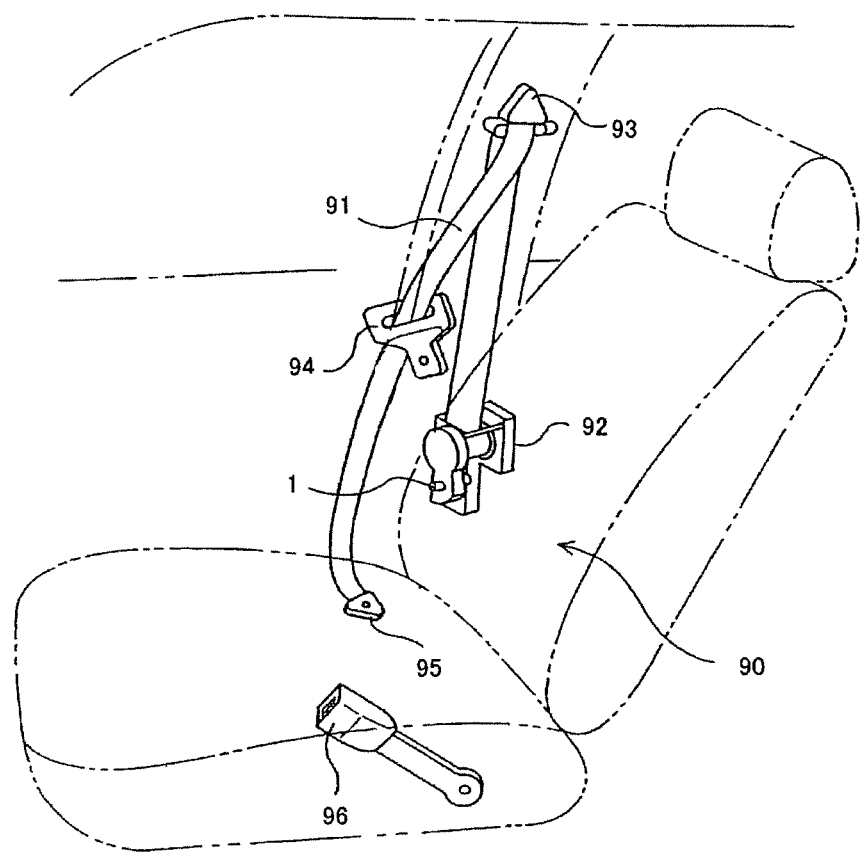
FIG. 11 is a view illustrating a seatbelt device provided with the electric motor of this embodiment.
Figure 12:
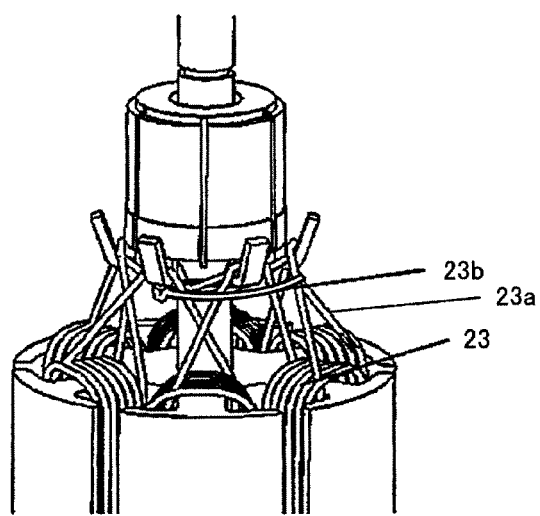
FIG. 12 is a perspective view of the rotor portion in a state in which a coil wire is wound of a prior-art electric motor seen from above.

FIG. 11 is a view illustrating a seatbelt device 90 provided with the electric motor 1 of this embodiment. The seatbelt device 90 includes a seatbelt 91 that constrains an occupant in emergency, a seatbelt retractor 92 that retracts the seatbelt 91, a guide anchor 93 for seatbelt that guides the seatbelt 91 withdrawn from this seatbelt retractor 92 toward the shoulder of the occupant, a tongue plate 94 slidably supported by the seatbelt 91 guided from the guide anchor 93 for seatbelt, a fixing anchor 95 that fixes an end portion of the seatbelt, a buckle 96 in which the tongue plate 94 is detachably inserted and engaged and the like, and the seatbelt 91 can be retracted by the seatbelt retractor 92 provided with the electric motor 1. Therefore, the seatbelt device provided with the electric motor can be stably operated.

INDUSTRIAL APPLICABILITY

According to the electric motor according to the present invention, a burden is not applied to a coil wire, disconnection or damage of the coil wire can be reduced, and productivity can be improved as compared with before. Moreover, the seatbelt device provided with this electric motor can be stably operated.

The invention claimed is:

1. A winding method of an electric motor, comprising:
   assembling a frame having a magnet on an inner circumference, a shaft rotatably supported by said frame, a rotor core fixed to said shaft, one coil wire wound around said rotor core, and a commutator fixed to said shaft and connected to said coil wire,
   wherein said rotor core has n pieces of teeth arranged in a circumferential direction around which said coil wire is wound,
   wherein said commutator has n pieces of segments,
   wherein said coil wire has a connecting wire portion that connects said teeth and said segments and a crossover portion that interconnects said segments at opposite pole positions of said commutator around said shaft,
   wherein said crossover portion that connects an i-th segment of said segments and an (i+n/2)th segment of said segments is wound prior to said connecting wire portion that connects the teeth connected with the i-th segment and the (i+1)th segment, respectively, and
   wherein i ranges from 1 to n.

2. An electric motor comprising:
   a frame having a magnet on an inner circumference;
   a shaft rotatably supported by said frame;
   a rotor core fixed to said shaft;
   one coil wire wound around said rotor core; and
   a commutator fixed to said shaft and connected to said coil wire,
   wherein said rotor core has a plurality of teeth arranged in a circumferential direction around which said coil wire is wound;
   wherein said commutator has segments in a same number as that of said plurality of teeth;
   wherein said coil wire has a connecting wire portion that connects said teeth and said segments and a crossover portion that interconnects said segments at opposite pole positions of said commutator around said shaft; and
   wherein said crossover portion is arranged inside said connecting wire portion.

3. A seatbelt device comprising:
   at least a seatbelt that constrains an occupant in an emergency,
   a seatbelt retractor that retracts the seatbelt, the seatbelt retractor having the electric motor of claim 2,
   a guide anchor for the seatbelt that guides said seatbelt withdrawn from the seatbelt retractor toward a shoulder of the occupant,
   a tongue plate slidably supported by said seatbelt guided from the guide anchor for the seatbelt, and
   a buckle in which said tongue plate is detachably inserted and engaged,
   wherein said seatbelt is retractable by said seatbelt retractor.

4. An electric motor, comprising:
   a frame having a magnet on an inner circumference;
   a shaft rotatably supported by said frame;
   a rotor core fixed to said shaft;
   one coil wire wound around said rotor core; and
   a commutator fixed to said shaft and connected to said coil wire,
   wherein said rotor core has n pieces of teeth arranged in a circumferential direction around which said coil wire is wound,
   wherein said commutator has n pieces of segments,
   wherein said coil wire has a connecting wire portion that connects said teeth and said segments and a crossover portion that interconnects said segments at opposite pole positions of said commutator around said shaft,
   wherein said crossover portion that connects an i-th segment of said segments and an (i+n/2)th segment of said segments is wound prior to said connecting wire portion that connects the teeth connected with the i-th segment and the (i+1)th segment, respectively, and
   wherein i ranges from 1 to n.

* * * * *